US007693887B2

(12) United States Patent
McLaughlin (10) Patent No.: US 7,693,887 B2
(45) Date of Patent: Apr. 6, 2010

(54) DYNAMIC IDENTIFICATION OF A NEW SET OF MEDIA ITEMS RESPONSIVE TO AN INPUT MEDIASET

(75) Inventor: Matthew R. McLaughlin, Corvallis, OR (US)

(73) Assignee: Strands, Inc., Corvallis, OR (US)

( * ) Notice: Subject to any disclaimer, the term of this patent is extended or adjusted under 35 U.S.C. 154(b) by 243 days.

(21) Appl. No.: 11/048,950

(22) Filed: Feb. 1, 2005

(65) Prior Publication Data

US 2006/0173910 A1 Aug. 3, 2006

(51) Int. Cl.
*G06F 17/00* (2006.01)
(52) U.S. Cl. ...................... 707/616; 707/913
(58) Field of Classification Search ............... 707/3, 707/104.1, 616, 913
See application file for complete search history.

(56) References Cited

U.S. PATENT DOCUMENTS

| 5,375,235 | A | 12/1994 | Berry |
| 5,483,278 | A | 1/1996 | Strubbe |
| 5,583,763 | A | 12/1996 | Atcheson |
| 5,724,521 | A | 3/1998 | Dedrick |
| 5,754,939 | A | 5/1998 | Herz |
| 5,758,257 | A | 5/1998 | Herz |
| 5,890,152 | A | 3/1999 | Rapaport |
| 5,918,014 | A | 6/1999 | Robinson |
| 5,950,176 | A | 9/1999 | Keiser |
| 6,000,044 | A | 12/1999 | Chrysos et al. |
| 6,047,311 | A | 4/2000 | Ueno et al. |
| 6,112,186 | A | 8/2000 | Bergh |
| 6,134,532 | A | 10/2000 | Lazarus et al. |
| 6,345,288 | B1 | 2/2002 | Reed |
| 6,346,951 | B1 | 2/2002 | Mastronardi |
| 6,347,313 | B1 | 2/2002 | Ma |
| 6,349,339 | B1 | 2/2002 | Williams |
| 6,381,575 | B1 | 4/2002 | Martin |
| 5,434,621 | A1 | 8/2002 | Pezillo |

(Continued)

FOREIGN PATENT DOCUMENTS

EP 1 050 833 8/2000

(Continued)

OTHER PUBLICATIONS

Apple: iTunes 4.2 User Guide for Windows; Dec. 2003; pp. 1-44.*

(Continued)

*Primary Examiner*—Shahid A Alam
*Assistant Examiner*—Alexandria Y Bromell
(74) *Attorney, Agent, or Firm*—Stolowitz Ford Cowger LLP (57) ABSTRACT

Systems and methods are disclosed for creating a list of media items that are similar to an input mediaset comprising at lease one input media item, optionally together with at least one input parameter that constrains the output in scope or number of items. Media items include music, videos, pictures and other such items that can be associated or grouped together by a human into a list or mediaset. The mediaset is formed by a human applying virtually any objective and/or subjective criteria. Those criteria need not be made explicit; a relation among the selected items is implicit in the list per se. Alternatively, objective criteria such as metadata can be used.

24 Claims, 4 Drawing Sheets

U.S. PATENT DOCUMENTS

| | | |
|---|---|---|
| 6,430,539 B1 | 8/2002 | Lazarus |
| 6,438,579 B1* | 8/2002 | Hosken ..................... 709/203 |
| 6,487,539 B1 | 11/2002 | Aggarwal et al. |
| 6,526,411 B1 | 2/2003 | Ward |
| 6,532,469 B1 | 3/2003 | Feldman |
| 6,577,716 B1 | 6/2003 | Minter |
| 6,615,208 B1 | 9/2003 | Behrens et al. |
| 6,647,371 B2 | 11/2003 | Shinohara |
| 6,687,696 B2 | 2/2004 | Hofmann |
| 6,690,918 B2 | 2/2004 | Evans |
| 6,751,574 B2 | 6/2004 | Shinohara |
| 6,785,688 B2* | 8/2004 | Abajian et al. .............. 707/102 |
| 6,842,761 B2* | 1/2005 | Diamond et al. ......... 707/104.1 |
| 6,850,252 B1 | 2/2005 | Hoffberg |
| 6,914,891 B2 | 7/2005 | Ha |
| 6,931,454 B2 | 8/2005 | Deshpande |
| 6,941,324 B2 | 9/2005 | Plastina |
| 6,947,922 B1 | 9/2005 | Glance |
| 6,987,221 B2* | 1/2006 | Platt ............................ 84/601 |
| 6,990,497 B2* | 1/2006 | O'Rourke et al. ........... 707/101 |
| 6,993,532 B1 | 1/2006 | Platt |
| 7,020,637 B2 | 3/2006 | Bratton |
| 7,021,836 B2 | 4/2006 | Bratton |
| 7,072,846 B1 | 7/2006 | Robinson |
| 7,082,407 B1* | 7/2006 | Bezos et al. .................. 705/26 |
| 7,096,234 B2 | 8/2006 | Plastina |
| 7,111,240 B2 | 9/2006 | Crow |
| 7,127,143 B2 | 10/2006 | Elkins |
| 7,136,866 B2 | 11/2006 | Springer, Jr. |
| 7,139,723 B2 | 11/2006 | Conkwright |
| 7,180,473 B2 | 2/2007 | Horie |
| 7,194,421 B2 | 3/2007 | Conkwright |
| 7,197,472 B2 | 3/2007 | Conkwright |
| 7,236,941 B2 | 6/2007 | Conkwright |
| 7,302,419 B2 | 11/2007 | Conkwright |
| 7,302,468 B2 | 11/2007 | Wijeratne |
| 7,363,314 B2* | 4/2008 | Picker et al. ................. 707/102 |
| 7,392,212 B2 | 6/2008 | Hancock |
| 7,403,769 B2 | 7/2008 | Kopra |
| 7,415,181 B2 | 8/2008 | Greenwood |
| 7,457,862 B2 | 11/2008 | Hepworth |
| 7,478,323 B2 | 1/2009 | Dowdy |
| 7,493,572 B2 | 2/2009 | Card |
| 7,505,959 B2* | 3/2009 | Kaiser et al. ..................... 707/2 |
| 7,546,254 B2 | 6/2009 | Bednarek |
| 7,568,213 B2 | 7/2009 | Carhart |
| 7,574,513 B2* | 8/2009 | Dunning et al. ............. 709/231 |
| 7,580,932 B2* | 8/2009 | Plastina et al. .................. 707/7 |
| 7,644,077 B2* | 1/2010 | Picker et al. .................... 705/2 |
| 2001/0056434 A1* | 12/2001 | Kaplan et al. ............. 707/104.1 |
| 2002/0002899 A1 | 1/2002 | Gjerdingen |
| 2002/0082901 A1 | 6/2002 | Dunning et al. |
| 2002/0152117 A1 | 10/2002 | Cristofalo |
| 2002/0178223 A1 | 11/2002 | Bushkin |
| 2002/0194215 A1 | 12/2002 | Cantrell |
| 2003/0033321 A1* | 2/2003 | Schrempp et al. ........ 707/104.1 |
| 2003/0055689 A1 | 3/2003 | Block |
| 2003/0120630 A1 | 6/2003 | Tunkelang |
| 2003/0212710 A1 | 11/2003 | Guy |
| 2003/0229537 A1 | 12/2003 | Dunning et al. |
| 2004/0003392 A1 | 1/2004 | Trajkovic |
| 2004/0068552 A1 | 4/2004 | Kotz |
| 2004/0073924 A1 | 4/2004 | Pendakur |
| 2004/0128286 A1 | 7/2004 | Yasushita |
| 2004/0139064 A1 | 7/2004 | Chevallier et al. |
| 2004/0215657 A1* | 10/2004 | Drucker et al. ........... 707/104.1 |
| 2004/0247715 A1 | 12/2004 | Polson |
| 2004/0263337 A1 | 12/2004 | Terauchi et al. |
| 2005/0050079 A1* | 3/2005 | Plastina et al. ............. 707/100 |
| 2005/0060350 A1* | 3/2005 | Baum et al. .............. 707/104.1 |
| 2005/0075908 A1 | 4/2005 | Stevens |
| 2005/0091146 A1 | 4/2005 | Levinson |
| 2005/0102610 A1 | 5/2005 | Jie |
| 2005/0114357 A1 | 5/2005 | Chengalvarayan |
| 2005/0141709 A1 | 6/2005 | Bratton |
| 2005/0154608 A1 | 7/2005 | Paulson |
| 2005/0193014 A1* | 9/2005 | Prince ..................... 707/104.1 |
| 2005/0193054 A1 | 9/2005 | Wilson |
| 2005/0195696 A1 | 9/2005 | Rekimoto |
| 2005/0198075 A1 | 9/2005 | Plastina et al. |
| 2005/0203807 A1 | 9/2005 | Bezos |
| 2005/0210101 A1 | 9/2005 | Janik |
| 2005/0216855 A1 | 9/2005 | Kopra et al. |
| 2005/0223039 A1* | 10/2005 | Kim et al. ................. 707/104.1 |
| 2005/0235811 A1 | 10/2005 | Dukane |
| 2005/0256867 A1 | 11/2005 | Walther |
| 2005/0276570 A1* | 12/2005 | Reed et al. ..................... 386/46 |
| 2006/0015571 A1 | 1/2006 | Fukuda |
| 2006/0015904 A1 | 1/2006 | Marcus |
| 2006/0018208 A1 | 1/2006 | Nathan |
| 2006/0018209 A1 | 1/2006 | Drakoulis |
| 2006/0020062 A1 | 1/2006 | Robinson |
| 2006/0026263 A1 | 2/2006 | Raghaven |
| 2006/0053077 A1 | 3/2006 | Mourad |
| 2006/0062094 A1 | 3/2006 | Nathan |
| 2006/0067296 A1 | 3/2006 | Bershad |
| 2006/0074750 A1 | 4/2006 | Clark |
| 2006/0080356 A1* | 4/2006 | Burges et al. ........... 707/103 R |
| 2006/0100978 A1 | 5/2006 | Heller |
| 2006/0112098 A1* | 5/2006 | Renshaw et al. ................ 707/7 |
| 2006/0168616 A1 | 7/2006 | Candelore |
| 2006/0173916 A1 | 8/2006 | Verbeck |
| 2006/0195462 A1* | 8/2006 | Rogers ....................... 707/100 |
| 2006/0195521 A1 | 8/2006 | New |
| 2006/0253847 A1 | 11/2006 | Stark et al. |
| 2006/0277098 A1 | 12/2006 | Chung |
| 2006/0288367 A1 | 12/2006 | Swix |
| 2007/0016507 A1 | 1/2007 | Tzara |
| 2007/0043829 A1 | 2/2007 | Dua |
| 2007/0100690 A1 | 5/2007 | Hopkins |
| 2007/0136264 A1 | 6/2007 | Tran |
| 2007/0156677 A1 | 7/2007 | Szabo |
| 2007/0244880 A1* | 10/2007 | Martin et al. ................... 707/5 |
| 2007/0250429 A1 | 10/2007 | Walser |
| 2007/0250761 A1 | 10/2007 | Bradley et al. |
| 2007/0271286 A1 | 11/2007 | Purang |
| 2007/0294096 A1 | 12/2007 | Randall |
| 2008/0004948 A1 | 1/2008 | Flake |
| 2008/0004990 A1 | 1/2008 | Flake |
| 2008/0027881 A1 | 1/2008 | Bisse |
| 2008/0046317 A1 | 2/2008 | Christianson |
| 2008/0077264 A1* | 3/2008 | Irvin et al. ..................... 700/94 |
| 2008/0084246 A1 | 4/2008 | Meijer |
| 2008/0133601 A1 | 6/2008 | Cervera |
| 2008/0155588 A1 | 6/2008 | Roberts |
| 2008/0220855 A1 | 9/2008 | Chen |
| 2008/0270221 A1 | 10/2008 | Clemens |
| 2009/0024504 A1 | 1/2009 | Lerman |
| 2009/0024510 A1 | 1/2009 | Chen |
| 2009/0073174 A1 | 3/2009 | Berg |
| 2009/0076939 A1 | 3/2009 | Berg |
| 2009/0076974 A1 | 3/2009 | Berg |
| 2009/0083307 A1 | 3/2009 | Cervera |
| 2009/0089222 A1 | 4/2009 | Ferreira |
| 2009/0106085 A1 | 4/2009 | Raimbeault |
| 2009/0210415 A1* | 8/2009 | Martin et al. ................... 707/5 |
| 2009/0276368 A1 | 11/2009 | Martin |

FOREIGN PATENT DOCUMENTS

| | | |
|---|---|---|
| EP | 1 231 7888 | 8/2002 |
| EP | 1420388 | 5/2004 |
| JP | 11-052965 | 2/1999 |
| JP | 2002-108351 | 4/2002 |

| | | |
|---|---|---|
| JP | 2002-320203 A | 10/2002 |
| JP | 2003-255958 | 9/2003 |
| JP | 2004-221999 A | 8/2004 |
| JP | 2005-027337 A | 1/2005 |
| KR | 2002025579 | 4/2002 |
| WO | 2003051051 A1 | 6/2003 |
| WO | WO2004007538 | 8/2004 |
| WO | 2005013114 A1 | 2/2005 |
| WO | WO2006052837 | 5/2006 |
| WO | 2006075032 | 7/2006 |
| WO | PCT/US2006034218 | 8/2006 |
| WO | 2006114451 | 11/2006 |
| WO | WO2007134193 | 5/2007 |
| WO | WO2007075622 | 7/2007 |
| WO | 20090149046 A1 | 12/2009 |

OTHER PUBLICATIONS

International Search Authority/US; PCT Search Report; Date Mar. 25, 2008; 3 Pages.
Deshpande, Mukund, et al., "Item-Based Top-N Recommendation Algorithms", ACM Transactions on Information Systems, 22:1 (Jan. 2004), pp. 143-177.
PCT/US2006/034218; USPTO Search Authority; PCT International Search Report; Feb. 9, 2007.
PCT/US06/38769; International Search Report Mar. 25, 2008.
WO 2007/092053 A1; International Search Report Aug. 16, 2007.
Alvear, Jose, "Risk-Free Trial Streaming Media Delivery Tools," Streaming Media.com; www.streamingmedia.com/article.ap?id=5768, Jun. 30, 2000.
Deshpande, Mukund, et al., "Item-Based Top-N Recommendation Algoriths," ACM Transactions on Information Systems, 22:1 (Jan. 2004), pp. 143-177.
Pachet, Francois, A Taxonomy of Musical Genres, Content-Based Multimedia Information Access Conference (RIAO), Paris, Apr. 2000, 8 pages. Not Submitted in IDS.
Platt, John C. et al., "Learning a Gaussian Process Prior for Automatically Generating Music Playlists," Microsoft Corporation {platt, cburgess, sswenson, chriswea}@microsoft.com, alcez@cs.berkeley.edu, pp. 1-9.
Platt, John S., "Fasting Embedding of Sparse Music Similarity Graphs," Microsoft Corporation, {jplatt@microsoft.com}.
Smart Computing, "The Scoop on File-Sharing Services," Dec. 2000, vol. 11, Issue 12; pp. 30-33 in printed issue. Available at www.smartcomputing.com/editorial/article.asp?article=articles%2F2000%Fs1112%2F08s12.asp.
www.akoo.com/Akoo/, Web Page, AKOO, Pick the Music, Waiting in the line at the Theme Park, Introducing the m-Venue™ platform.
www.axcessnews.com/modules/wfsection/article.php?articleid=8327, Web Page, Feb. 24, 2006, Maintenance Fees, Digital Music Sales Triple to $1.1 Billion in 2005.
www.bmi.com/news/200403/20040324b.asp, Web Page, BMI ™ Figures Don't Lie, Mar. 24, 2004, Touch Tunes Signs License Agreement for BMI Music in Digital Jukeboxes.
www.ecastinc.com/music_licensing.html, Web Page, Ecast Network, interactive entertainment network, Music/Licensing.
www.rfidjournal.com/article/articleview/1619/1/1, Web Page, RFID brings messages to Seattle side walks on RFID system being deployed next week will send marketing and assistive information to users carrying active RFID tags. RFID Journal.
www.roweinternational.com/jukeboxes_dia.html, Web Page, Digital Internet Access Jukeboxes, Rowe International.
www.touchtunes.com, Web Page, Touchtunes, Turn your ROWE 100A's and 100B's into touch tunes Digital Jukeboxes—Bose.
www.alwayson-network.com/comments.php?id=P12663 0 37 0 C, Web Page, Not Your Average Jukebox, On Hollywood 1000 contender Ecast uses broadbank to being the digital media experience to your watering hole.
Cano, Pedro et al., On the Use of FastMap for Audio Retrieval and Browsing, The International Conference on Music Information Retrieval and Related Activities (ISMIR 2002), Paris, France, Oct. 2002, 2 pages.
Connell, Iain et al., Ontological Sketch Models: Highlighting User-System Misfits, in P. Palanque, E. O'Neill and P. Johnson, editors, Proceedings of Human Computer Interaction (HCI) Bath, England, Sep. 2003, London Springer, pp. 1-16.
The Trustees of Indiana University, Variations2, The Indiana University Digital Music Library, http://dml.indiana.edu/, last updated May 11, 2005.
Logan, Beth, Content-Based Playlist Generation: Exploratory Experiments, The International Conference on Music Information Retrieval and Related Activities (ISMIR 2002), Paris, France, Oct. 2002, 2 pages.
Logan, Beth et al., A Music Similarity Function Based on Signal Analysis, IEEE International Conference on Multimedia and Expo (ICME), Tokyo, Japan, Aug. 2001, IEEE Press, pp. 952-955.
Maidin, Donncha O et al., The Best of Two Worlds: Retrieving and Browsing, Proceedings of the COST G-6 Conference on Digital Audio Effects (DAFX-00), Verona, Italy, Dec. 7-9, 2000, 4 pages.
Notess, Mark et al., Variations2: Toward Visual Interface for Digital Music Libraries, Second International Workshop on Visual Interfaces to Digital Libraries, 2002, 6 pages.
Pampalk, Elias et al., Content-based Organization and Visualization of Music Archives, ACM Multimedia, Juan les Pins, France, Dec. 2002, pp. 570-579.
Pauws, Steffen et al., PATS: Realization and User Evaluation of an Automatic Playlist Generator, The International Conferences on Music Information Retrieval and Related Activities (ISMIR 2002), Paris, France, Oct. 2002, 9 pages.
Rauber, Andreas et al., The SOM-enhanced JukeBox: Organization and Visualization of Music Collections Based on Perceptual Models, Journal of New Music Research, vol. 32, Nov. 2, 2003, pp. 193-210.
Shneiderman, Ben, Tree Visualization with Tree-Maps: 2-d Space-Filling Approach, ACM Transactions on Graphics, vol. 11, No. 1, Jan. 1992, pp. 92-99.
Treemap, University of Maryland, http://www.cs.umd.edu/hcil/treemap/, last udpated Aug. 5, 2003, 4 pages.
Shneiderman, Ben, Treemaps for Space-Contrained Visualization of Hierarchies, http://www.sc.umd.edu/heil/treemap-history/, last updated Apr. 28, 2006, 16 pages.
Tzanetakis, George et al., MARSYAS3D: A Prototype Audio Browser-Editor Using a Large Scale Immersive Visual and Audio Display, Proceedings of the 2001 International Conference on Auditory Display, Espoo, Finland, Jul./Aug. 2001, 5 pages.
"New Music Recommendation System is Based on FOAF Personal Profiling," www.masternewmedia.org/music_recommendation/music_recommendation_system_FOAF, Oct. 1, 2005.
"Social Networking Meets Music Listening: Mecora Launches Radio 2.0," www.masternewmedia.org/news/2006/04/13/social_networking_meets_music_listening.htm, Apr. 13, 2006.
S. Baluja, R. Seth, D. Sivakumar, Y. Jing, J. Yagnik, S. Kumar, D. Ravichandran, and M. Aly, "Video Suggestion and Discovery for YouTube: Taking Random Walks Through the View Graph". In WWW '08: Proceedings of the 17th international conference on World Wide Web, pp. 895-904, Beijing, China, 2008. ACM Press.
N.A. Lazar; Bayesian Empirical Likelihood; Technical Report, Carnegi Mellon University, Department of Statistics, 2000; 26 pages.
A. Das, M. Datar, A. Garg, and S. Rajaram. "Google News Personalization: Scalable Online Collaborative Filtering". In WWW '07: Proceedings of the 16th international conference on World Wide Web, pp. 271-280, New York, NY, USA, 2007. ACM Press.
J. Dean and S. Ghemawat, "MapReduce: Simplied Data Processing on Large Clusters". Commun. ACM, 51 (1):107-113, 2008.
Y. Dempster, N. Laird, and D. Rubin. "Maximum Likelihood from Incomplete Data via the EM Algorithm". Jour. of the Royal Stat. Soc., Ser. B., 39:1047-1053, 1977.
T. Hofmann. "Unsupervised Learning by Probabilistic Latent Semantic Analysis". Mach. Learn., 42:177-196, 2001.
T. Hofmann. "Latent Semantic Models for Collaborative Filtering". ACM Transactions on Information Systems, 22:89-115, 2004.
P. Indyk and J. Matousek. "Low-Distortion Embeddings of Finite Metric Spaces". In Handbook of Discrete and Computational Geometry, pp. 177-196. CRC Press, 2004.
I. Scihira. "A Characterization of Singular Graphs". Electronic Journal of Linear Algebra, 16:451-462, 2007.

Augmenting the Social Space of an Academic Conference; McCarthy, et al. Information School, Univeristy of Washington and Department of Computer Science and Engineering, University of Minnesota; pp. 1-10; Nov. 6-10, 2004.

Baluja, S., Seth, R., Sivakumar, D., Jing, Y., Yagnik, J., Kumar, S., Ravichandran, D., and Aly, M. "Video Suggestion and Discovery for YouTube: Taking Random Walks Through the View Graph". In WWW '08: Proceedings of the 17th international conference on World Wide Web, pp. 895-904, Beijing, China, 2008. ACM Press.

Carlson et al. "Internet Banking Market Developments and Regulartory Issues In the New Ecomomy: what Changed, and the Challenges for Ecemonic Policy . . . "; May 2001; http://www.occ.gov/netbank/SGEC2000.pdf.

Co-Construction of Hybrid Spaces; Asa Rudstrom; A Dissertation submitted to the University of Stockholm in partial fulfillment of the requirements for the Degree of Doctor of Philosophy; Depatemtnt of Computer and Systems Sciences Stockholm University and Royal Institute of Technology; pp. 1-69; Nov. 2005.

Das,A., Datar,M., Garg,A., and Rajaram,S. "Google News Personalization: Scalable Online Collaborative Filtering". In WWW '07: Proceedings of the 16th international conference on World Wide Web, pp. 271-280, New York, NY, USA, 2007. ACM Press.

Dean, J. and Ghemawat, S. "MapReduce: Simplied Data Processing on Large Clusters". Commun. ACM, 51(1):107-113, 2008.

Dempster, Y., Laird, N., and Rubin, D. "Maximum Likelihood from Incomplete Data via the EM Algorithm". Jour. of the Royal Stat. Soc., Ser. B., 39:1047-1053, 1977.

Hofmann, T. "Latent Semantic Models for Collaborative Filtering". ACM Transactions on Information Systems, 22:89-115, 2004.

Hofmann, T. "Unsupervised Learning by Probabilistic Latent Semantic Analysis". Mach. Learn., 42:177-196, 2001.

Industry Standard, The, Help FAQs for Standard Prediction Market, http://www.thestandard.com/help, downloaded Jun. 29, 2009.

Indyk, P. and Matousek, J. "Low-Distortion Embeddings of Finite Metric Spaces". In Handbook of Discrete and Computational Geometry, pp. 177-196. CRC Press, 2004.

International Search Report PCT/US2009/051233; Sep. 4, 2009; Strands, Inc.

IP City, Integrated Project on Interaction and Presence on Urban Environments-Demonstrators on Large-Scale Events Applications; ipcity.eu; Giulio Jacucci, John Evans, Tommi Ilmonen; pp. 1-37; Feb. 9, 2007.

Lazar, N.A.; Bayesian Empirical Likelihood; Technical Report, Carnegi Mellon University, Department of Statistics, 2000; 26 pages.

MobiLenin—Combining A Multi-Track Music Video, Personal Mobile Phones and a Public Display into Multi-User Interactive Entertainment; Jurgen Scheible, et al. Media Lab, Univeristy of Art and Design, Helsinki, Finland; pp. 1-10; Nov. 6-10, 2005.

PCT/US2007/068708; International Search Report; May 10, 2007.

PCT/US07/068708; Filed May 10, 2007; International Search Report and Written Opinion; WO 2007/134193; Dec. 7, 2007.

PCT/US09/42002; Filed Apr. 28, 2009; International Search Report and Written Opinion; Jun. 2009.

PCT/US09/45911; Filed Jun. 2, 2009; International Search Report and Written Opinion.

Scihira, I. "A Characterization of Singular Graphs". Electronic Journal of Linear Algebra, 16:451-462, 2007.

Toward University Mobile Interaction for Shared Displays; Tim Paek, et al.; Microsoft Research, Redmond, WA; pp. 1-4; Nov. 6-10, 2004.

Trustees of Indiana University, Variations2, The Indiana University Digital Music Library, http://dmi.indiana.edu/, last updated May 11, 2005.

Wolfers, Justin and Zitzewitz, Eric, Prediction Markets, Journal of Economic Perspectives, Spring 2004, pp. 107-126, vol. 18, No. 2.

Yen, Yi-Wyn, Apple announces a 32GB iPhone 3G by Jun. 15, 2009, The Industry Standard, Apr. 2, 2009, http://www.thestandard.com/preditions/channel/hardware, downloaded Apr. 8, 2009.

PolyLens: A Recommender System for Groups of Users; M. O'Connor, D. Cosley, J.A. Konstan, J. Riedl; European Conference on Computer Supported Co-Operative Work at Bonn, Germany; Published 2001; pp. 199-218.

Toward alernative metrics of journal impact: a comparison of download and citation data, Johan Bollen, Herbert Van de Sompel, Joan Smith, Rick Luce, Google.com, 2005, pp. 1-2.

Apple: iTunes 4.2 User Guide for Windows; Dec. 2003; retrieved from the internet: URL: http://www2.austin.cc.tx.us/tcm/projects/itunes.pdf; pp. 10, 17-19. (Added Ref Nov. 5, 2009).

Incremental tensor analysis: theory and applications, Jimeng Sun, Dacheng Tao, Spiros Papadimitriou, Philip Yu, Christos Faloutsos, ACM, Oct. 2008, pp. 1-37.

PCT/US2007/09/45725; International Search Report_WO; Jul. 15, 2009.

PCT/US2006/004257 European Search Report Oct. 23, 2009.

IEEE, no matched results, Nov. 11, 2009, 1 page.

PCT/ES2005/00003 Written Opinion of the International Searching Authority Report dated Jun. 10, 2005.

PCT/ES2005/000213 Written Opinion of the International Searching Authority dated Jan. 12, 2006.

PCT/ES2005/00003 Written Opinion of the International Preliminary Examining Authority dated Mar. 19, 2007.

PCT/ES2005/00003 International Preliminary Report on Patentability (Ch II) Report dated May 22, 2007.

PCT/ES2005/000213 International Preliminary Report on Patentability (Ch II) Report Dated Nov. 15, 2007.

ShopSmart: Product Recommendations through Technical Specifications and User Reviews; Alexander Yates et al. Temple University; CIKM; Oct. 26-30, 2008, Napa Valley, CA, USA; 2 pages.

John Thompson, "A Graphic Representation of Interaction With the NEXIS News Database," MIT Thesis (May 1983).

Lippman, et al., "News and Movies in the 50 Megabit Living Room," IEEE/IEICE, Global Telecommunications Conference, pp. 1976-1981 (Nov. 15, 1987).

Bender, et al., "Newspace: Mass Media and Personal Computing," Proceedings of USENIX, Conference, pp. 329-348 (Summer 1991).

Lie, "The Electronic Broadsheet—All The News That Fits The Display," MIT Master's Thesis, pp. 1-96 (Jun. 1991).

Jonathan L. Orwant, "Doppelganger: A User Modeling System," MIT Bachelor's Thesis (Jun. 1991).

"Lessons from LyricTimeTM: A Prototype Multimedia System" 4th IEEE ComSoc International Workshop on Multimedia Communications (Apr. 1992).

Belkins, et al., "Information Filtering and Information Retrieval: Two Sides of the Same Coin?", Communications of the ACM (Dec. 1992).

Architecting Personalized Delivery of Multimedia Information,: Communications of the ACM (Dec. 1992).

Jonathan L. Orwant, "Doppelgänger Goes to School: Machine Learning for Use Modeling," MIT Master of Science Thesis (Sep. 1993).

Jon Orwant, "Appraising the User of User Models: Doppelgänger's Interface," in: A. Kobsa and D. Litman (eds.), Proceeding of the 4th International Conference on User Modeling (1994).

Bender, "Twenty Years of Personalization: All about the Daily Me," Educause Review (Sep./Oct. 2002).

\* cited by examiner

Figure 1
Conceptual Diagram

Figure 2 – System Component View

DYNAMIC IDENTIFICATION OF A NEW SET OF MEDIA ITEMS RESPONSIVE TO AN INPUT MEDIASET

COPYRIGHT NOTICE

©2005 MusicStrands, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

The present invention relates generally to the field of data processing. More specifically, the present invention relates to techniques for identifying media items having characteristics in common with an input set of media items.

BACKGROUND OF THE INVENTION

With the explosion of digital music and digital video, consumers are faced with more and more options of media that they can purchase and/or access. Consumers are finding themselves overwhelmed with the masses of options of digital media from which they can pick.

As the cost of digital storage continues to drop, online vendors of media, particularly music, are finding that the incremental cost of increasing the number of digital media in their inventory is rapidly dropping. Thus online vendors are offering more and more content—expanding both the diversity of the content, but also the age and quantity of historical releases available. Combine this with the truly global nature of the internet, and the end result is a completely bewildering array of media that is immediately available for purchase and playing. New systems and methods are needed to enable consumers to search and explore this space, limiting the decision space to a size with which consumers are comfortable making decisions.

Current technologies and approaches for achieving the goal of limiting the space of options down to manageable sizes are either undesirable or incomplete. In one class of approaches, automatic content analysis (such as signal analysis for music) is used to extract features of the media, then correlate user tastes with those features; this approach is limited because the features on which user tastes are really based are often much more complex than can be inferred by a computer program.

In another class of approaches, a user's preferences are solicited on human defined metadata characteristics, and related media that matches those metadata characteristics that the user identifies with the most are selected. This approach fails because a) users' tastes are generally more complex then the rigid metadata allows, and b) one must first map all of the media onto values of the metadata characteristics, an expensive and time-consuming process.

Accordingly, there is a need for improved methods and systems for generating media recommendations for users that is cost-effective and scalable, and has the ability to capture complex tastes and adapt to new evolutions in taste.

SUMMARY

The recent evolution of technology for distributing and playing digital media has created a large population of end consumers using software for managing and playing digital media. Almost every media player provides the ability to create and store "sets", which allow users to create named lists of "related" media items. Thus, if we consider the collection of all sets stored on the media players of all those users of digital media players, we have an impressive collection of knowledge that can be used to identify media items that are related to each other.

Mediasets are created by humans to group together media items that they feel are related. This is often a somewhat subjective judgment. Importantly, we commonly have no explicit information regarding what exactly the items have in common—only knowledge that there is some relatedness between items in the mediaset. An important aspect of the present invention is a method for leveraging those judgments to generate sets of related media items, without having to actually discover or articulate the specific characteristics that users applied in creating their own mediasets. This invention exploits information implicit in mediaset data.

One aspect of the present invention provides a system and methods for generating a related set of media items when given a query set of related media items, where all of the items in the query set have been determined by some human to be related in some way. The system creates a new set of media items by merging existing sets of media items, where each of those sets contains items related to each other, and each of those sets shares some similarity with the items in the query set. Embodiments of the invention can be used advantageously in networked and standalone applications.

Additional aspects and advantages will be apparent from the following detailed description of preferred embodiments, which proceeds with reference to the accompanying drawings.

DETAILED DESCRIPTION OF PREFERRED EMBODIMENTS

Reference is now made to the figures in which like reference numerals refer to like elements. For clarity, the first digit of a reference numeral indicates the figure number in which the corresponding element is first used.

In the following description, certain specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc.

In some cases, well-known structures, materials, or operations are not shown or described in detail in order to avoid obscuring aspects of the invention. Furthermore, the described features, structures, or characteristics may be combined in any suitable manner in one or more embodiments. In general, the methodologies of the present invention are advantageously carried out using one or more digital processors, for example the types of microprocessors that are commonly found in PC's, laptops, PDA's and all manner of desktop or portable electronic appliances.

Figure 1:
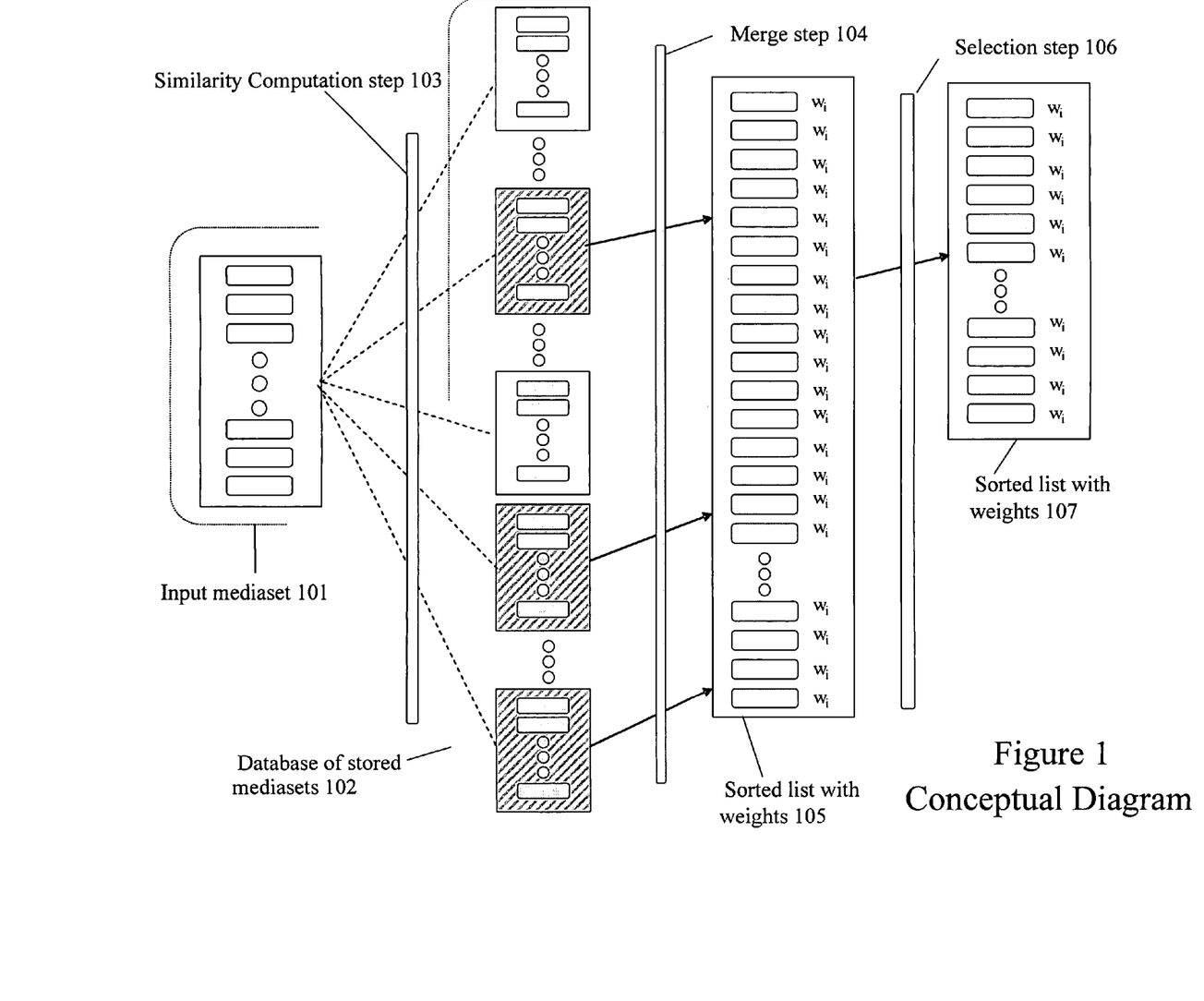
FIG. 1 is a conceptual diagram of a method of generating a list of media items, responsive to an input mediaset, in accordance with one embodiment of the invention.

FIG. 1 is a conceptual diagram of one embodiment of a method of the present invention. In FIG. 1, an input mediaset (101) is a set of descriptors of media items. (We use "input mediaset" and "query mediaset" interchangeably.)

In the Similarity Computation Step (103), the input mediaset (101) is compared with a database of previously collected mediasets, and a similarity weight is computed between the input mediaset (101), and each of the individual mediasets from the database (102). In the Merge Step (104), the mediasets from the database (102) with the highest similarity (similarity weight values) relative to the Input Mediaset are merged into a single large list of media items (105), each media item in the list (105) having a weight value associated with it. The weight values are intended to reflect the relatedness of each associated media item to the Input mediaset. The entire list (105) of media items is sorted by the weight values. In the final selection step (106), a desired number of items are selected from the top of list 105, and output in an output list (107).

A mediaset is a set of media items (or descriptors of media items), where the items in the set have been determined by a human to be related in some fashion or to have some characteristics in common. Media items may be audio, video, images, or other such types of media. Generally the mediaset will contain descriptors (pointers or identifiers) of the item, rather than digital representations the media items themselves, because media such as music or video can be very large.

A common example of a mediaset is a manually constructed music playlist, where a human has placed songs together in the playlist, because they feel that those songs belong together for some reason. The power of mediasets is that the relatedness function is not restricted to dimensions on which we have metadata (e.g. name, artist, genre, etc). Often we as humans are able to indicate that a set of movies, music, etc "feel" similar to us, without being able to say why. Note that items in a mediaset may share common metadata values—a mediaset could also be created by a human who chooses media items based on having particular values of predefined metadata characteristics (such as artist, genre).

Each element in the mediaset represents a single media item in the perspective of the human who created the mediaset. However, different people may have different perspectives about what constitutes a single media item. In the music domain, for example, you may have two different versions of the same song done by an artist—one live and one in the studio. The similarity computation step can be configured to match at different levels of abstraction—for example, the system can be configured to return related tracks or to return related songs. Thus, it may be necessary in some embodiments to map from a specified media item in the Input Mediaset to a more general description of an item, such as in music, mapping from a track (a specific recording) to a song (which could represent all recordings of a particular song by an artist). A further abstraction would map the song title to all recordings of that song title by all artists.

An "item" in a mediaset may be specified as a unique identifier (unique to the implementation of the invention) for a media item, or it may comprise a set of metadata characteristics and associated values that the creator of the mediaset believes identify a unique media item. Examples of specifications of items in a mediaset of music might be ("trackid=123129") or ("title=Brand New Day", "artist=Sting"). In the first case, the person creating the mediaset probably selected the song from a list of songs in a user interface, and in the case of the second example, the person creating the mediaset may not realize that there could be as many as ten different recordings of "Brand New Day" by Sting.

Figure 2:
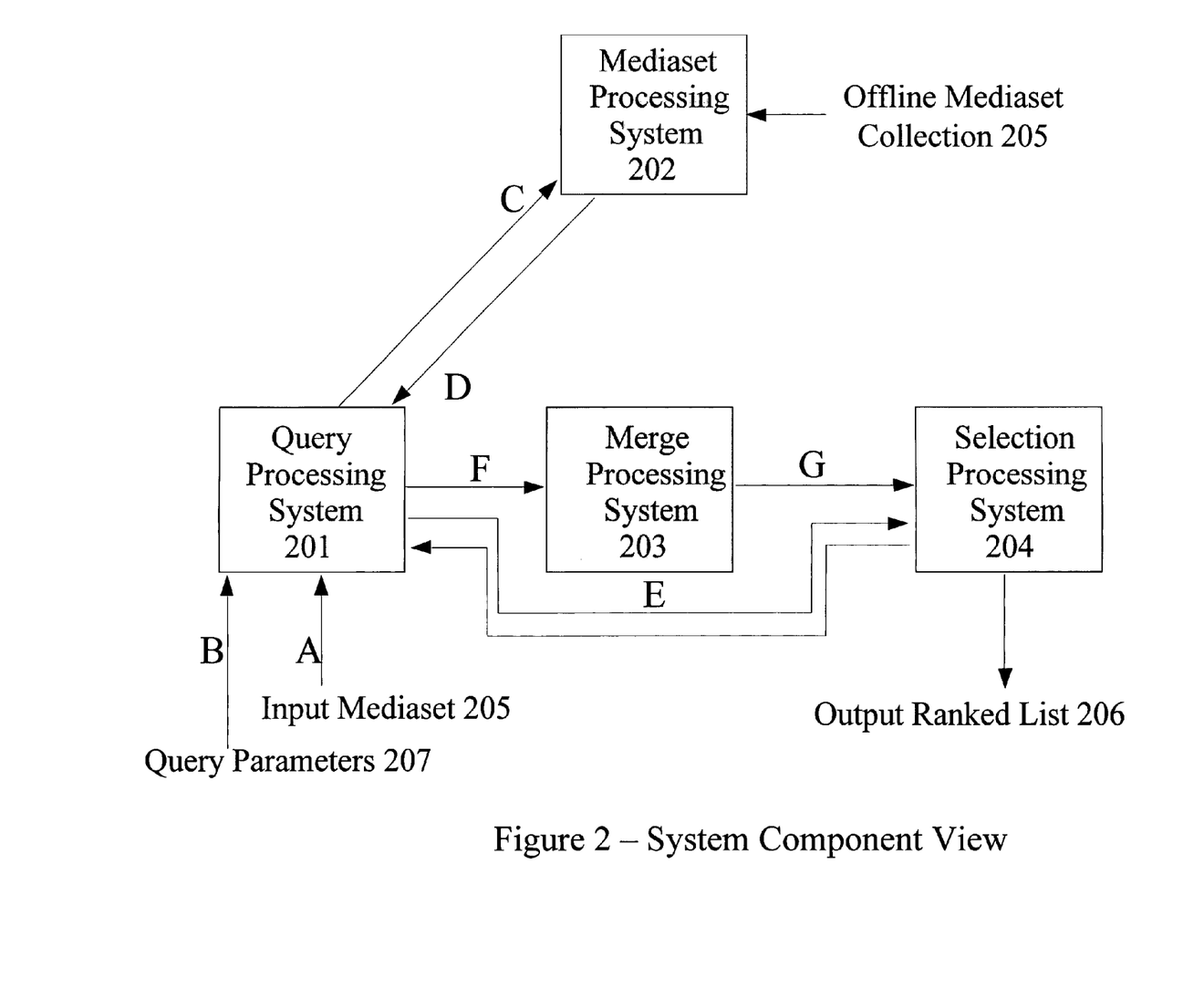
FIG. 2 is a block diagram of principle system components and communication paths among them in accordance with one embodiment of the invention.

As an example of an interaction with one embodiment of the invention for music, an Input Mediaset might be supplied with:

Beatles—Ticket to Ride
    Elton John—Tiny Dancer
    Fleetwood Mac—Go Your Own Way . . . and the system might output the following results:

Bob Dylan—Like a Rolling Stone
    Stevie Wonder—Isn't She Lovely
    Eagles—Hotel California
    Talking Heads—Burning Down the House
    Pink Floyd—Wish You Were Here
    U2—With or Without You
    Van Morrison—Brown-Eyed Girl Components of a Presently Preferred Embodiment Referring now to FIG. 2, the principle components of one embodiment of the invention and their interactions are shown in a block diagram. In this implementation, which is merely illustrative, a Mediaset Processing System (202) is responsible for storing large numbers of mediasets, and indexing those mediasets to enable rapid retrieval of mediasets by the Query Processing System (201). Mediasets are fed into the Mediaset Processing System from two sources. The first source are Input Mediasets (101), which are stored during or after the query processing has happened. Secondarily, mediasets may be fed directly into the Mediaset Processing System from other external sources (205), often in an offline batch mode. Through the first source, the size of the mediaset database grows with every query to the invention. With each growth, the capability of the invention increases.

The Query Processing System (201) receives an Input Mediaset (101 in FIG. 1), see path "A", and an optional set of Query Parameters (207), path "B". The query parameters can include, by way of example and not limitation, a desired result (output) set size, a flag to request that the result list be cached for future queries, and lists of metadata characteristics for further limiting the result sets.

The Query Processing System matches each entry in the Input Mediaset onto a unique media item recognized by the Mediaset Processing System, path "C". If the specification of the media item in the Input Mediaset could potentially map to multiple media items recognized by the Mediaset Processing System, then the Query Processing System either picks the best matching item (by some predefined criteria) or causes the query to fail—perhaps enabling a user interface to request clarification from the user. See FIG. 3 described below. The choice of action may optionally be configured by the Query Parameters.

Optionally (potentially configured by the Query Parameters), the Query Processing System (210) may map all media items in the Input Mediaset to a similar level of abstraction. For example, in the music domain, references to specific recordings may be mapped to references to songs (which may represent all recordings of a song).

The Query Processing System retrieves a list of mediasets, path "D", from the Mediaset Processing System (202) that each have at least one media item in common with the Input Mediaset. The Query Processing System may optionally (potentially specified by the Query Parameters) check with the Selection Processing System (204), path "E", to see if the Input Mediaset is identical to a recent Input Mediaset for which the Selection Processing System has memorized the result (see description of the Selection Processing System below for more details). If the result of the query is not already known by the Selection Processing System, then the Input Mediaset, the Query Parameters, and the list of retrieved mediasets are passed to the Merge Processing System (203), path "F".

The Merge Processing System (203) is responsible for merging the list of retrieved mediasets into a single ranked list of media items, such that higher ranked items are more likely to be related to the items in the Input Mediaset. The operation of the merging may be altered by the values of the Query Parameters. The ranked list consists of the union of all retrieved mediasets, ordered by a computed item similarity weight. The computation of the item weight is described in more detailed in the Procedural Description of the Merge Processing section below.

The ranked list of media items, the Input Mediaset, and the Query Parameters are transmitted to the Selection Processing System (204) (see paths "E" and "G"), which is responsible for selecting a subset of the ranked list appropriate for the current context of the application using the invention. For example, if the system is being used to present results in a web-based user interface, then the top ten items (or some other predetermined number) might be selected from the ranked list. Additionally for a web-based user interface, there might be a need to display the 11th through 20th items in the ranked list. See output ranked list (206).

The Selection Processing System (204) may optionally limit the selected items to items that match metadata characteristics optionally specified by the Query Parameters (207). For example, the Query Parameters may specify that the selected items should be limited to music of the "Classical" genre, or music from a particular country, or music from date range.

The Selection Processing System (204) may optionally keep a memory of ranked lists recently generated by the Merge Processing System (perhaps configured by the Query Parameters), to support repeated selection from the same ranked list (such as might be needed when displaying consecutive pages of search results on a user interface). This memory ensures that the consecutive selections from the same query are consistent even if the database of mediasets change. On the other hand, if novelty is more important than consistency, the Selection Processing System may also incorporate a randomization factor into the selection, such that items towards the top of the ranking are more likely to be selected, but it is unlikely that exactly the top will be selected and unlikely that the same items will be selected if the same query is presented multiple times. The selected items are then outputted.

Figure 3:
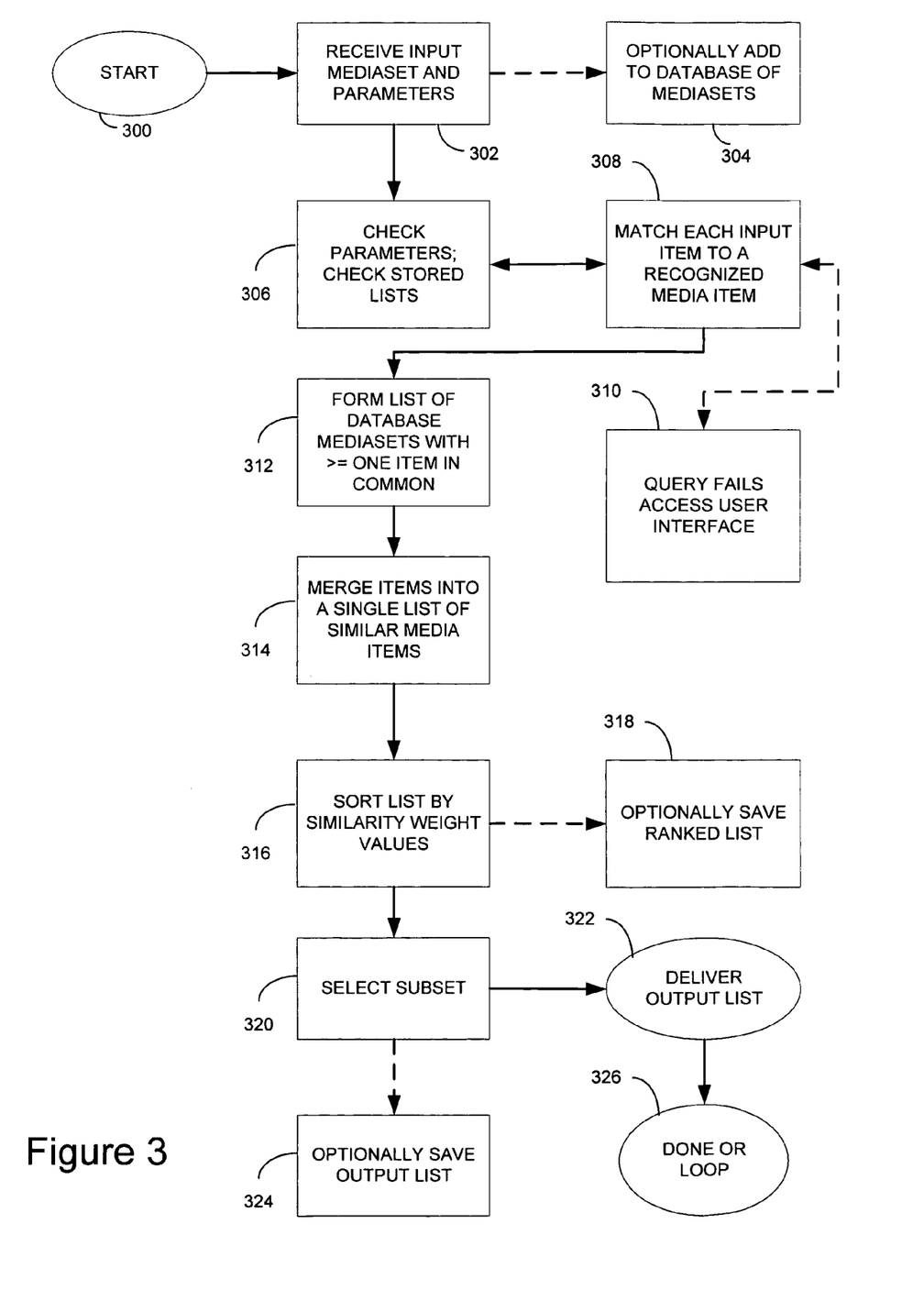
FIG. 3 is a flowchart illustrating a method of generating an output set of media items, responsive to an input mediaset, in accordance with an embodiment of the invention.

The foregoing methodologies are further illustrated in the flow chart of FIG. 3. Briefly, beginning at 300, the process calls for receiving an input mediaset 302, which optionally can include parameters as discussed above. Parameters are checked, and stored lists are checked 306 for any that match the present query. The next step 308 is matching each input mediaset item to an item in the mediaset collection database. If no match can be found for a given item, a user interface can be invoked 310 to return a message or seek clarification of the item. Next is forming a list of the mediasets in the database identified as having at least one item in common with the input mediaset, step 312. The items comprising those identified mediasets are then merged, step 314, into a single list of media items. That list is then sorted, step 316, by similarity weight values, further described below. This sorted list optionally can be stored, step 318, as explained above. A subset of the sorted list is selected, step 320, in accordance with input parameters or predetermined parameters. The selected subset list forms the output list, which is then delivered, step 322, to the user or requesting application. The process is completed at step 326. The foregoing steps can be implemented in hardware, software, or a combination thereof. Various functions can be distributed as well, over a network server and client machines.

Procedural Description of the Merge Processing System

The Merge Processing System (203) in one embodiment seeks to create a merged list of media items such that, the more related an item is to the items presented in the Input Mediaset, the higher the ranking of that item in the merged list. It does this by looking for media items that occur frequently in the retrieved mediasets, but do not occur in the Input Mediaset. Determination of "similar" mediasets is explained below.

The inventors have observed that in media domains we generally find that a relatively small percentage of media items are accessed the majority of the time. Based on that observation, we expect that where people are asked to create mediasets of related items, "popular" media items will occur in many more of those mediasets than relatively less-popular items. The probability of occurrence of a popular item in a mediaset will be high, independent of the other items in the mediaset.

Thus, if we observe two mediasets that have the same popular item, we have less reason to believe that this observation indicates that the mediasets are modeling similar functions of relatedness than if we observe two mediasets to have the same non-popular item. To capture this characteristic, we compute a discrimination weight $d_i$ for each media item $m_i$ in the Input Mediaset. The discrimination weight is computed as a function of a ratio of the number of occurrences of the media item $m_i$ in the stored mediasets (numerator) to the number of occurrences of all the media items in the Input Mediaset across all the mediasets in the stored mediasets (denominator). The method in one embodiment is as follows:

Compute discrimination weight $d_i$ as described above for each media item $m_i$ in the Input Mediasets.

Compute similarity between the Input Mediaset and each stored mediaset that has at least one media item found in the Input Mediaset. The similarity is computed as a sum of the discrimination weights of the items co-occurring in the stored mediaset and the Input Mediaset. The similarity of any one Mediaset can be capped to a predetermined constant.

Compute the item rank weight for every item that appears in the retrieved mediasets but does not occur in the Input Mediaset. Add this item and its associated weight to the ranked list. The rank weight is computed by taking the sum of the similarities of the retrieved mediasets where the item occurs.

Optionally, compute an inverse popularity score for each item in the ranked list, where the inverse popularity score is higher for non-popular items, and lower for popular items. Multiply the rank weight of each item in the ranked list by the inverse popularity score. Resort the ranked list according to the new adjusted weight.

Output the ranked list.

Figure 4:
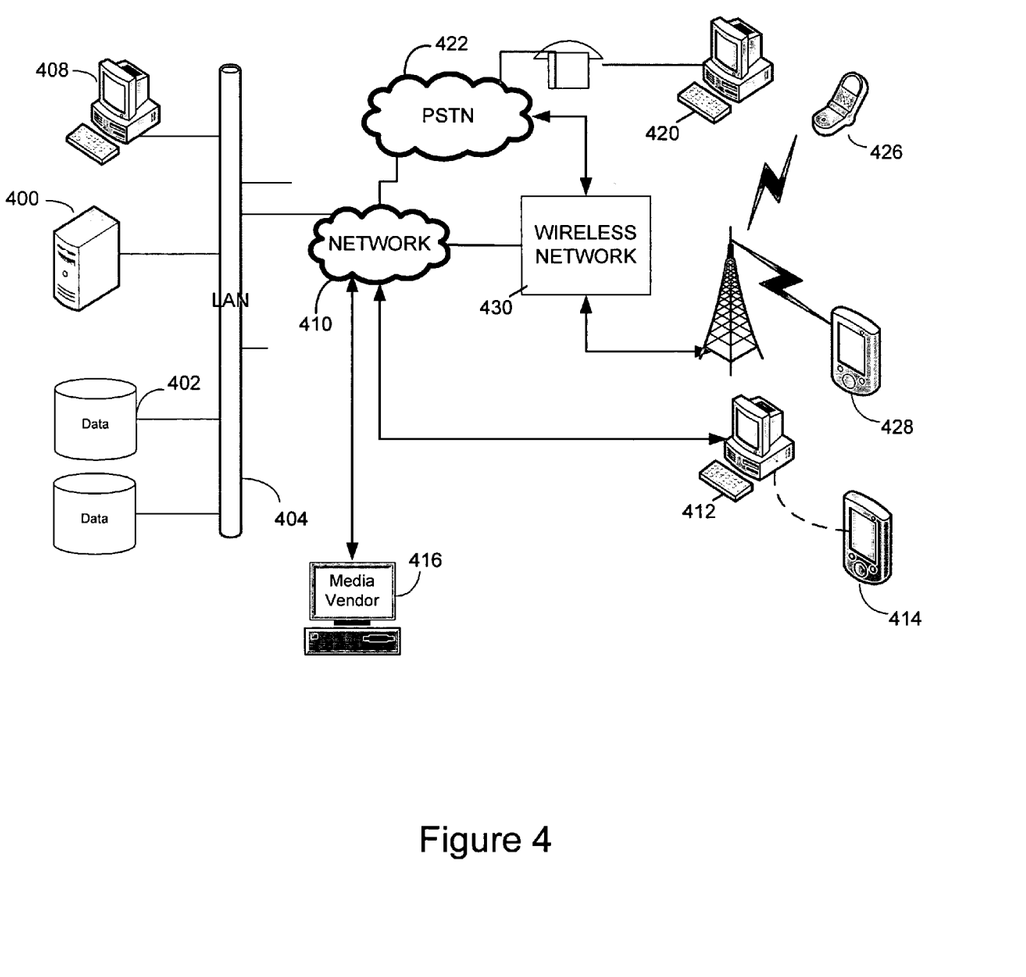
FIG. 4 is a networking/communications diagram illustrating selected applications of embodiments of the invention.

Referring now to FIG. 4, a network/communication diagram illustrates some applications of embodiments of the invention. In FIG. 4, a server system 400 can be configured to host software that implements the processes described above. The server 400 can be coupled to a LAN 404 using any of a variety of known networking protocols, and thereby access a data store 402 which can be used to maintain a database of mediasets. (Of course, the data store can be directly coupled to the server in an alternative embodiment.) A desktop computer 408 or the like can be used to interface with the server, for maintenance and administrative functions, accounting, etc. An administrator can use computer 408 to download mediasets via an external network 410, for example the Internet, and add them to the data store 402.

The server 400 can be configured to provide output lists of related media items or recommendations in response to a user input query as explained above in various scenarios or business methods. For example, the network server 400 can be configured to support client music search and discovery software that is integrated into popular media players such as iTunes(r) and Windows Media Player(r). The music search application can be deployed, for example, in a client computer 412. The client computer optionally can support a portable music player 414. The client computer 412 has access to the server 400 via the public or private network 410. In this scenario, the client software extracts playlists that have been created in media players, sends these playlists to the server as an input mediaset, and receives a response containing a list of related items that the user might be interested in playing (if they own the media) or purchasing.

In terms of a business method, when the user chooses to purchase an item suggested in the output related media items, the user can be redirected to an online site 416 that sells digital music. If the user then purchases music, a percentage of the sales (or some other consideration) flows to the company deploying the client software pursuant to a prearranged contractual relationship. The client software may be available for free download, or a price may be charged for it.

In an alternative business opportunity, an implementation of the present invention can be licensed to vendors of CD-media burning kiosks (not shown). In these kiosks, a consumer walks up to a device with a display, selects a set of media items to purchase, pays for those items, and is provided with a CD (or other portable storage media) containing the purchased items. In this scenario, recommendation software that implements an embodiment of the invention described herein is installed on the kiosk, and the software controlling the user interface interacts with the recommendation software provide lists of related items. Thus, after the consumer has specified at least one media item, the kiosk can recommend related media items that may be of interest. Once the consumer has purchased a list of items, this list can be sent to the recommendation software, which can generate a new list of media items that the consumer may want to additionally purchase. Thus the present invention can be employed to enable consumers to quickly build a list of songs to purchase, without having to be overwhelmed with selecting from a massive collection. The kiosk can include a stand-alone version of the recommendation software described herein, or it can access a remote server (like 400) or ASP.

The server system 400, 402, 404 is merely illustrative of a wide variety of hardware and software implementations of the invention and is not intended to be limiting in any way. As further shown in FIG. 4, the system can be used by end users who have dialup access 420, via the PSTN 422 or other transport. Because they are receiving a list of recommendations, and not necessarily downloading actual media content, bandwidth is not a significant issue. Wireless devices including cell phone 426, and PDA 428 can also access the recommendation services (as well as download content) via the wireless network 430.

Another alternative business model calls for licensing software that embodies aspects of the invention to online vendors of digital media such as music or video, to enable increased sales of music per consumer, and increased attraction and retention of consumers to their portals or platforms that support digital media. For example, enabling recommendation software can be licensed to such online vendors of digital music, who run the software on their servers. The vendors design into their user interface a feature that enables their consumers to specify input mediasets, and the recommendation software returns a list of related media items. Thus the consumer specifies a mediaset of items that captures their current interest, and get in return a new set of media items that they are likely to want to view or purchase. In this fashion, consumers can quickly locate items that they will be willing to purchase. The enabling recommendation software, implementing the present invention, can be licensed to the music or other media vendor on mutually acceptable financial terms, e.g. applying flat rates or a royalty based on generated sales. The music vendor need not be online; similar advantages can be enjoyed at a brick and mortar location as well, such as a record or video store.

It will be obvious to those having skill in the art that many changes may be made to the details of the above-described embodiments without departing from the underlying principles of the invention. The scope of the present invention should, therefore, be determined only by the following claims.

The invention claimed is:

1. A method for dynamically generating a set of media items related to an input set of media items comprising the steps of:
   (a) receiving an input mediaset wherein the input mediaset comprises a list of unique identifiers, each unique identifier corresponding to a respective media item
   (b) comparing the input mediaset list of unique media item identifiers to a database of predetermined mediasets, each of the predetermined mediasets comprising respective lists of unique media item identifiers;
   wherein said comparing step comprises identifying which of the predetermined mediasets includes at least one unique media item identifier that matches one of the unique media item identifiers within the input mediaset list of unique media item identifiers; and wherein said matching is with regard to the unique media item identifiers and without regard to a descriptor, characteristic, classification or attribute of any of the media items themselves;
   (c) merging all the identified predetermined mediasets into a single merged list of similar media items; and
   (d) creating an output set of media items by selecting one or more media items from the merged list of similar media items and;
   (e) delivering a list of the output set of media items.

2. The method in claim 1, wherein the items in the input mediaset were selected by one or more persons so as to form the input mediaset.

3. The method in claim 1, wherein the input mediaset have been at least partially ordered as deemed appropriate by a human.

4. The method in claim 1, wherein said creating the output set of media items includes selecting a randomized subset of the top items of the merged list.

5. The method in claim 1, wherein the database of mediasets resides on a network server, and the merging and creating an output set occurs on that network server.

6. The method in claim 1, wherein the database of mediasets resides on or coupled to a network server, and the merging and selection operations occur on a client computer operated by a user.

7. The method in claim 1, and further comprising storing the input mediaset in the said database.

8. The method in claim 1, wherein the media items include music songs and tracks.

9. The method in claim 1, wherein the media items include video items.

10. The method in claim 1, wherein such media items include images.

11. A storage medium bearing computer executable instructions for carrying out the method of claim 1.

12. A method according to claim 1 including computing a discrimination weight for each media item listed in the input mediaset.

13. A method according to claim 1 wherein said merging all the identified predetermined mediasets into a single ranked list of similar media items includes:
for each of the identified predetermined mediasets, computing a metric of its similarity to the input mediaset.

14. A method according to claim 13 wherein said computing a metric of similarity to the input mediaset comprises:
computing a discrimination weight for each media item in the input mediaset; and
for each of the identified predetermined mediasets, computing the metric of its similarity to the input mediaset as a function of the discrimination weights of the media items co-occurring in the input mediaset and the predetermined mediaset.

15. A method according to claim 13 wherein said merging all the identified predetermined mediasets into a single ranked list of media items includes:
assembling a list of all media items that occur in the identified predetermined mediasets but do not occur in the input mediaset; and
computing an item rank weight for each item on the assembled list.

16. A method according to claim 15 wherein said computing an item rank weight comprises:
determining in which of the retrieved mediasets the item occurs; and
calculating the item rank weight as a function of the similarity metrics of the retrieved mediasets in which the item occurs to the input mediaset.

17. The method in claim 1, further comprising receiving one or more input parameters that are used to restrict the output set of media.

18. The method in claim 17, wherein at least one parameter is specified by the user.

19. The method in claim 1, wherein said creating an output set includes filtering the items of the ranked list according to a predefined parameter.

20. The method in claim 19 wherein the predefined parameter is specified by the user.

21. The method in claim 19, wherein the predefined parameter includes one of an artist, album, genre, or sub-genre.

22. A kiosk for distributing digital music items comprising:
means for receiving from a user an input list of one or more music items selected by the user;
means for converting the input list to a list of unique identifiers, each unique identifier corresponding to a respective music item on the input list;
means for accessing a database comprising a plurality of previously stored lists of music items;
wherein each of the stored lists comprises a list of unique identifiers, each unique identifier corresponding to a respective music item;
computer means for identifying at least one unique identifier among the unique identifiers listed in the previously stored lists of music items that does not correspond to a music item on the input list and has a predefined relationship to the input list of music items;
wherein the predefined relationship is determined by first identifying which of the previously stored lists of music items includes at least one unique identifier that matches one of the unique identifiers corresponding to the input list of music items;
wherein said matching is determined with regard to the unique identifiers and without regard to a descriptor, characteristic, classification or attribute of any of the corresponding media items themselves; and then including within the defined relationship all of the unique descriptors listed in the identified previously stored lists of music items;
means for merging all the identified previously stored lists of music items into a single merged list of similar media items; and
output means for recommending at least one music item to the user wherein the recommended music item corresponds to the identified unique identifier.

23. A kiosk for distributing digital music according to claim 22 wherein the database is located remote from the kiosk and is accessed via a network.

24. A kiosk for distributing digital music according to claim 22 wherein the computer means is located remote from the kiosk and is accessed via a network.

* * * * *

UNITED STATES PATENT AND TRADEMARK OFFICE
CERTIFICATE OF CORRECTION

PATENT NO. : 7,693,887 B2
APPLICATION NO. : 11/048950
DATED : April 6, 2010
INVENTOR(S) : Matthew R. McLaughlin It is certified that error appears in the above-identified patent and that said Letters Patent is hereby corrected as shown below:

| | |
|---|---|
| Title page, Item (57) (Abstract), line 2: | Delete "lease" and insert -- least --, therefor; |
| Title page, Item (56) Page 3, column 1 (Other Publications), line 14: | Delete "Algoriths," and insert -- Algorithms, --, therefor; |
| Page 3, column 1 (Other Publications), line 49: | Delete "broadbank" and insert -- broadband --, therefor; |
| Page 3, column 2 (Other Publications), line 35: | Delete "udpated" and insert -- updated --, therefor; |
| Page 3, column 2 (Other Publications), line 36: | Delete "Space-Contrained" and insert -- Space-Constrained --, therefor; |
| Page 3, column 2 (Other Publications), line 37: | Delete "heil" and insert -- hcil --, therefor; |
| Page 3, column 2 (Other Publications), line 60: | Delete "Simplied" and insert -- Simplified --, therefor; |
| Page 4, column 1 (Other Publications), line 2: | Delete "Univeristy" and insert -- University --, therefor; |
| Page 4, column 1 (Other Publications), lines 10-11: | Delete "Regulartory" and insert -- Regulatory --, therefor; |
| Page 4, column 1 (Other Publications), line 11: | Delete "Ecomomy:" and insert -- Economy: --, therefor; |
| Page 4, column 1 (Other Publications), line 16: | Delete "Depatemtnt" and insert -- Department --, therefor; |

Signed and Sealed this

Seventh Day of December, 2010

David J. Kappos
*Director of the United States Patent and Trademark Office*

Title Page
Page 4, column 1 (Other Publications), line 44:   Delete "Carnegi" and insert -- Carnegie --, therefor;

Page 4, column 1 (Other Publications), line 47:   Delete "Univeristy" and insert -- University --, therefor;

Page 4, column 1 (Other Publications), line 62:   Delete "http://dmi.indiana.edu/," and insert -- http://dml.indiana.edu/, --, therefor;

Page 4, column 2 (Other Publications), line 5:    Delete "preditions" and insert -- predictions --, therefor;

Page 4, column 2 (Other Publications), line 10:   Delete "alernative" and insert -- alternative --, therefor;

Page 4, column 2 (Other Publications), line 55:   Delete "Use" and insert -- User --, therefor; and Column 8, line 67 (Claim 4):                      Delete "merged" and insert -- ranked --, therefor.